United States Patent
Fei et al.

(10) Patent No.: US 8,119,057 B2
(45) Date of Patent: Feb. 21, 2012

(54) METHOD FOR SYNTHESIZING BULK CERAMICS AND STRUCTURES FROM POLYMERIC CERAMIC PRECURSORS

(75) Inventors: Weifeng Fei, Orlando, FL (US); Arnold Hill, Orlando, FL (US); Linan An, Oviedo, FL (US)

(73) Assignee: University of Central Florida Research Foundation, Inc., Orlando, FL (US)

( * ) Notice: Subject to any disclaimer, the term of this patent is extended or adjusted under 35 U.S.C. 154(b) by 391 days.

(21) Appl. No.: 12/372,297

(22) Filed: Feb. 17, 2009

(65) Prior Publication Data
US 2009/0209405 A1    Aug. 20, 2009

Related U.S. Application Data

(60) Provisional application No. 61/029,651, filed on Feb. 19, 2008.

(51) Int. Cl.
*B28B 1/00* (2006.01)
*B28B 3/00* (2006.01)
*B28B 5/00* (2006.01)
*C04B 33/32* (2006.01)
*C04B 33/36* (2006.01)
*C04B 35/64* (2006.01)
*C04B 35/00* (2006.01)
*C04B 35/52* (2006.01)

(52) U.S. Cl. ........ 264/658; 501/88; 501/96.1; 501/96.2; 264/659; 264/647

(58) Field of Classification Search .................. 264/646, 264/647, 658, 659; 501/96.1, 96.2, 96.3, 501/96.4, 96.5, 97.1, 88
See application file for complete search history.

(56) References Cited

U.S. PATENT DOCUMENTS

| | | | | |
|---|---|---|---|---|
| 5,221,294 A | * | 6/1993 | Carman et al. | 51/296 |
| 5,632,834 A | | 5/1997 | Ostertag | |
| 5,976,454 A | | 11/1999 | Sterzel | |
| 6,153,547 A | * | 11/2000 | Sterzel | 501/80 |
| 6,521,246 B2 | * | 2/2003 | Sapieszko et al. | 424/423 |
| 2002/0140137 A1 | | 10/2002 | Sapieszko | |

OTHER PUBLICATIONS

Kleebe et al. Deomposition-Crystallization of Polymer-Derived Si-C-N Ceramics. J. Am. Ceram. Soc., 81 [11] 2971-77 (1998).*

(Continued)

*Primary Examiner* — Jerry Lorengo
*Assistant Examiner* — Noah Wiese
(74) *Attorney, Agent, or Firm* — Brian S. Steinberger; Joyce P. Morlin; Law Offices of Brian S. Steinberger, P.A.

(57) ABSTRACT

A method and product made by using a polymeric ceramic precursor to synthesize dense, crack-free bulk ceramics in a technique using a sacrificial mold provides a ceramic structure for many technical, medical and industrial applications. The novel process uses an open cell material as a sacrificial mold to shape a ceramic precursor during curing. The cured ceramic green body can be machined and shaped to form the desired ceramic structure prior to final pyrolysis. The open cell material forms gas release paths to release large amount of gases generated during the pyrolysis of the cured ceramic precursor. After pyrolysis, an intact, dense, crack-free ceramic structure with high purity, strength and durability is obtained. Uses of the present invention include, but are not limited to, bulk ceramic parts, ceramic crucibles, a replacement material in some applications involving glass, silicon carbides, silicon nitrides, hafnium carbide and the like.

16 Claims, 4 Drawing Sheets

OTHER PUBLICATIONS

Kroke, Edwin et al., Silzane Derived Ceramics and Related Materials, Reports: A Review Journal, 2000, pp. 97-199, vol. 26.

Riedel, R. et al., Synthesis of Dense Silicon-Based Ceramics at low Temperatures, Nature, 1992, pp. 714-717, vol. 355.

Riedel, R. et al., Polymer-Derived Si-Based Bulk Ceramics, Part I: Preparation, Processing and Properties, Journal of the European Ceramic Society, 1995, pp. 703-715, vol. 15.

Konetschny, Christoph et al., Dense Silicon Carbonitride Ceramics by Pyrolysis of Cross-linked and Warm Pressed Polysilazane Powders, Journal of the European Ceramic Society, 1999, 2789-2796, vol. 19.

Greil, Peter, Polymer Derived Engineering Ceramics, Advanced Engineering Materials, 2000, 339-348, vol. 2, No. 6.

Liew, Li-Anne et al., Fabrication of SiCN Ceramic MEMS Using Injectable Polymer-Precursor Technique, Elsevier Science, 2001, pp. 64-70, vol. 89.

Shah, Sandeep R. et al., Mechanical Properties of a Fully Dense Polymer Derived Ceramic Made by a Novel Pressure Casting Process, Acta Materialia, 2002, pp. 4093-4103, vol. 50.

Harshe, Rahul et al., Amorphous Si(Al)OC Ceramic from Polysiloxanes: Bulk Ceramic Processing, Crystallization Behavior and Applications, Institute of Materials Science, 2004, pp. 3471-3482, vol. 24.

* cited by examiner

METHOD FOR SYNTHESIZING BULK CERAMICS AND STRUCTURES FROM POLYMERIC CERAMIC PRECURSORS

The present application claims the benefit of priority from U.S. Provisional Patent Application Ser. No. 61/029,651 filed on Feb. 19, 2008 and is incorporated herein by reference.

FIELD OF THE INVENTION

This invention relates to polymer derived ceramics (PDCs) and, more particularly, to a method and product made by using polymeric ceramic precursors to synthesize dense, crack-free bulk ceramics in a technique using a sacrificial mold that forms gas release paths to release gases generated during pyrolysis of the ceramic precursor.

BACKGROUND AND PRIOR ART

Recently it has been demonstrated that covalent bonded ceramics, such as silicon carbides (SiC, SiOC), silicon nitrides ($Si_3N_4$, SiCN), aluminum nitride (AlN) and hafnium carbide (HfC) can be synthesized by thermal decomposition of suitable polymeric precursors, and are referred to as polymer derived ceramics (PDCs).

Traditionally, bulk PDC objects can only be made through a powder-compact-pyrolysis route, which sacrifices many of the advantages of the technique.

Edwin Kroke et al in "Silazane Derived Ceramics and Related Materials" *Materials Science and Engineering*, 26 (2000) pages 97-199, provide a state of the art review of the synthesis, process and properties of non-oxide silicon-based ceramic materials derived from silazane and polysilazane precursor compounds. Kroke et al acknowledge the evolution of elaborate ways to utilize especially designed and synthesized silazanes, as well as commercial Si-based polymers. The demonstrated processing of silazanes to ceramic materials include the classical approach by liquid phase sintering of silazane-derived amorphous Si/C/N powders with additives and the non-classical approach which involves the direct transformation of molecular and polymeric silazanes to silicon nitride/carbide-based ceramics. Kroke et al. concluded that further development of the silazane derived silicon-based non-oxide ceramics is needed. It is specifically mentioned that formation and amount of volatile side products during the polymer-to-ceramic transformation has to be controlled and minimized.

In the quest for an ideal dense silicon-based bulk ceramic material, with desired properties, ease of manufacture, low costs and availability of raw materials, several scientific journal articles report on synthesis techniques. For example, R. Riedel et al in "Synthesis of Dense Silicon-Based Ceramics at Low Temperatures" *Nature* 335 20 February 1992, pages 714-717, reports the direct transformation of a metallorganic precursor into non-oxide silicon-based ceramics with relative densities of up to 93% in a process for making ceramic components and matrix composites at unusually low temperatures (1000° C.) using an infusible polymethylsilazane powder and without the addition of sintering aids.

R. Riedel et al. in "Polymer-Derived Si-Based Bulk Ceramics, Part I: Preparation, Processing and Properties" *Journal of the European Ceramic Society* 15 (1995) 703-715 describes the synthesis and processing of dense silicon-based bulk ceramic materials from the thermal decomposition of preceramic organosilicon polymers such as polysilazanes and polysilanes via three different routes using infusible polysilazane powders or powder blends as the starting materials.

C. Konetschny et al. in "Dense Silicon Carbonitride Ceramics by Pyrolysis of Cross-linked and Warm Pressed Polysilazane Powders" *Journal of the European Ceramic Society* 19 (1999) 2789-2796 reports on the pyrolysis and densifactiion behavior of cross-linked poly(hydridomethylsilazane) powders.

Peter Greil in "Polymer Derived Engineering Ceramics" *Advanced Engineering Materials* 2000 (2) No. 6 339-348 reports that bulk components can be produced using preceramic polymer binders that yield a higher green density especially with powders of low packing density. Filler powder surface may also be used to control shaping and curing behavior.

Li-Anne Liew et al. in "Fabrication of SiCN Ceramic MEMS Using Injectable Polymer-Precursor Technique" *Sensors and Actuators A* 89 (2001) 64-70 report on cost-effective technology for the fabrication of high-temperature MEMS based on injectable polymer-derived ceramics where liquid-phase polymers are cast into molds and converted into monolithic, fully dense ceramics by thermal decomposition.

Sandeep R. Shah et al in "Mechanical Properties of a Fully Dense Polymer Derived Ceramic Made by a Novel Pressure Casting Process" in *Acta Materialia* 50 (2002) 4093-4103 describes a two-step process for obtaining fully dense samples of silicon carbonitride (SiCN) from polymers including a first step of cross-linking the liquid organic precursor under pressure, followed by a second step of controlled pyrolysis. Net shape processing is possible by casting the liquid into a mold before polymerization.

Rahul Harshe et al in "Amorphous Si(Al)OC Ceramic from Polysiloxanes: Bulk Ceramic Processing, Crystallization Behavior and Applications" in *Journal of the European Ceramic Society* 24 (2004) 3471-3482 discusses bulk Si—Al—O—C ceramics produced by pyrolysis of commercial poly(methylsilsesquioxane) precursors. Prior to the pyrolysis the precursors were cross-linked with a catalyst, or modified by the sol-gel-technique with an Al-containing alkoxide compound, namely alumatrane. Modification of polysiloxane by alumatrane forms dense, crack-free SiAlOC ceramics with improved high temperature stability as compared to Al-free SiOC compositions.

None of the prior art references use a simple, inexpensive, process for forming dense, crack-free bulk ceramic structures. The novel process and products of the present invention meet a commercial need for the production of bulk ceramic parts in a non-labor and energy intensive process, providing a green body that is tough and can be easily machined.

As compared to the traditional powder metallurgy based ceramic processing, the technique of the present invention has many advantages, including high purity, low temperature processing and no sintering aids.

SUMMARY OF THE INVENTION

It is a primary objective of the present invention to provide a process and method for synthesizing dense bulk ceramics so that the gas released during polymer-ceramic conversion does not result in the formation of cracks and pores in the ceramic structure.

A second objective of the present invention is to provide a process and method for synthesizing dense bulk ceramics from the thermal decomposition of polymeric precursors in a technique using sacrificial molds, which will form gas release paths, to release the large amount of gases generated during pyrolysis of the precursors and avoid the formation of cracks and pores.

A third objective of the present invention is to provide a process and method for synthesizing dense bulk ceramics in a technique using sacrificial molds that are pre-formed or formed in-situ.

A fourth objective of the present invention is to provide a process and method for synthesizing dense bulk ceramics in a technique using sacrificial molds that are pre-formed in the form of an open cell network.

A fifth objective of the present invention is to provide a process and method for synthesizing dense bulk ceramics in a technique using sacrificial molds that are burned out at a temperature lower than the thermal decomposition temperature of the polymeric precursors, during pyrolysis, leaving a channel network that allows the gaseous products from the pyrolysis of the ceramic precursor to escape without building up pressure which would cause cracks.

A sixth objective of the present invention is to provide a process and method for synthesizing dense bulk ceramics and structures from a polymeric ceramic precursor wherein the ceramic green body is suitable for machining and shaping.

A seventh objective of the present invention is to provide a process and method for synthesizing dense bulk ceramics and structures from a polymeric ceramic precursor wherein the ceramic green body resembles a dense, hard plastic and after curing, can be easily machined into various shapes using a lathe, laser or other tooling.

An eighth objective of the present invention is to provide a process and method for synthesizing dense bulk ceramics and structures from a polymeric ceramic precursor wherein the ceramic green body is shaped and resembles a dense hard plastic and the original shape is maintained with a shrinkage ratio during pyrolysis.

A ninth objective of the present invention is to provide a process and method for synthesizing dense bulk ceramics and structures from a polymeric ceramic precursor wherein the pyrolysis temperature can be as low as 1000° C. Higher temperatures will result in higher density and higher strength ceramic products.

An tenth objective of the present invention is to provide a dense, crack-free ceramic material that can be shaped and machined like plastic materials before pyrolysis.

A preferred method for synthesizing a dense, crack-free bulk ceramic structure includes selecting an open cell material to function as a mold, saturating the open cell material with a ceramic precursor, curing the open cell material saturated with the ceramic precursor to form a ceramic green body, shaping the ceramic green body into a bulk structure, and pyrolizing the shaped green body, in an oxygen-free atmosphere at temperatures and for a period of time to form a dense, crack-free bulk ceramic structure.

The preferred method includes the use of a ceramic precursor that is at least one of a liquid ceramic precursor or a liquid ceramic precursor based slurry, wherein the liquid ceramic precursor based slurry consists of metal particles or ceramic particles suspended in a liquid ceramic precursor.

The more preferred method uses open cell material with a cell size of less than approximately 1 mm to approximately 3 mm and a decomposition temperature is in a range from a temperature that is lower than the starting decomposition temperature of the ceramic green body and a temperature that is slightly higher than the starting decomposition temperature of the ceramic green body; the preferred open-cell material is selected from at least one of a polymeric foam, a polymeric sponge, a glass fiber mesh, a metal fiber mesh, a cotton ball, a cotton candy, a spun fabric, and a woven fabric, more preferably, the open-cell material is a polymeric foam, most preferably, the polymeric foam is open-cell polyurethane with cell size less than 1 mm to approximately 3 mm.

It is preferred that the open-cell material form gas release paths to release large amount of gases generated during the thermal decomposition of the ceramic precursor, wherein the open-cell material functions as a sacrificial mold and decomposes during the pyrolysis of the cured ceramic green body.

Preferably, the open-cell material functions as a sacrificial mold and is removed by a process selected from at least one of washing, radioactive treatment and thermal decomposition before the pyrolysis of the cured ceramic green body or the open-cell material functions as a sacrificial mold and is removed by a process selected from at least one of washing, radioactive treatment and thermal decomposition during the pyrolysis of the cured ceramic green body.

It is also preferred that the ceramic green body is shaped by a process selected from one of machining, using a lathe, and using a laser; thereafter, heating of a shaped green body is in an oxygen-free atmosphere, including, but not limited to nitrogen, argon, ammonia and the like, at a temperature range between approximately 800° C. and approximately 1600° C. Most preferably, the oxygen-free atmosphere is nitrogen.

The preferred synthesis method outlined above provides a dense, crack-free ceramic structure.

A preferred process for preparing a dense, crack-free bulk ceramic structure includes selecting an open-cell material to function as a mold, infiltrating the open-cell material with a liquid ceramic precursor, curing the open-cell material infiltrated with the liquid ceramic precursor to form a ceramic green body, shaping the ceramic green body, and pyrolizing the shaped green body, in an atmosphere selected from one of nitrogen, argon and ammonia at temperatures and for a period of time to form a dense, crack-free bulk ceramic structure. The preferred open-cell material is a polymeric foam and the preferred liquid ceramic precursor is selected from at least polysilazane, polysiloxane, polycarbosilane, and a mixture thereof.

Further objects and advantages of this invention will be apparent from the following detailed description of the presently preferred embodiments, which are illustrated schematically in the accompanying drawings.

DESCRIPTION OF THE PREFERRED EMBODIMENTS

Before explaining the disclosed embodiments of the present invention in detail, it is to be understood that the invention is not limited in its application to the details of the particular arrangements shown since the invention is capable of further embodiments. Also, the terminology used herein is for the purpose of description and not of limitation The term "ceramic green body" refers to a body of material that can be converted into a ceramic upon firing or pyrolysis.

The term "dense" includes a range of densities for the final ceramic product which is dependent on the type of open-cell material or polymeric foam and is defined as 80% to 98% of theoretical maximum density.

The term "open-cell material" is used herein to refer to porous, woven, spun, materials with open spaces between fibers or particles that form a network of pores or openings, such as, but not limited to, sponges, foams, fabrics and the like.

Figure 1:
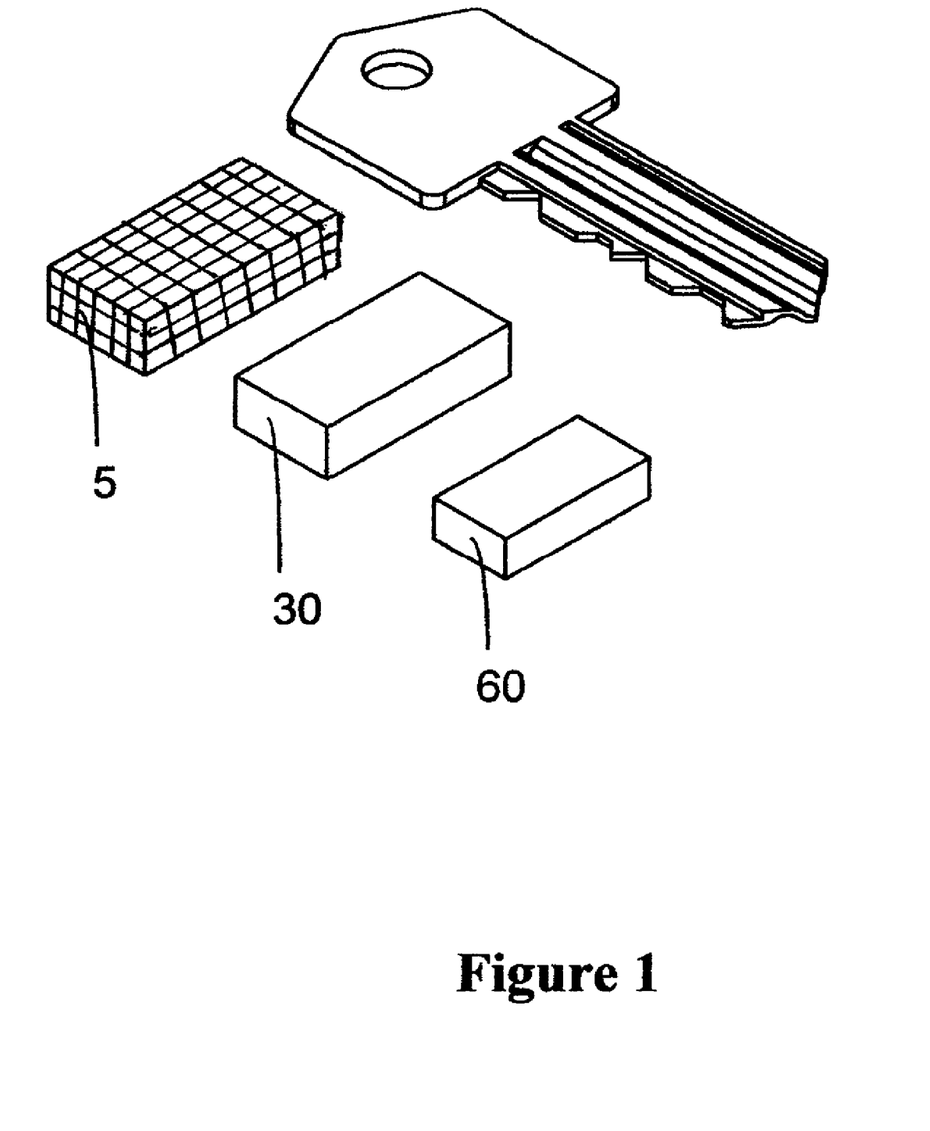
FIG. 1 is a perspective drawing of three distinct precursor/product phases in the synthesis of dense silicon based ceramics in the present invention.

According to the present invention, the objectives stated above are met by engineering ceramics in a process described in greater detail below. The novel ceramic green body and high density bulk ceramics and structures obtained from a polymeric ceramic precursor are shown in FIG. 1. The starting material is polymer foam 5 which is infiltrated with a polymeric ceramic precursor and then cured to form a ceramic green body 30. Pyrolysis of the ceramic green body produces a dense, crack-free ceramic structure 60.

Figure 2:
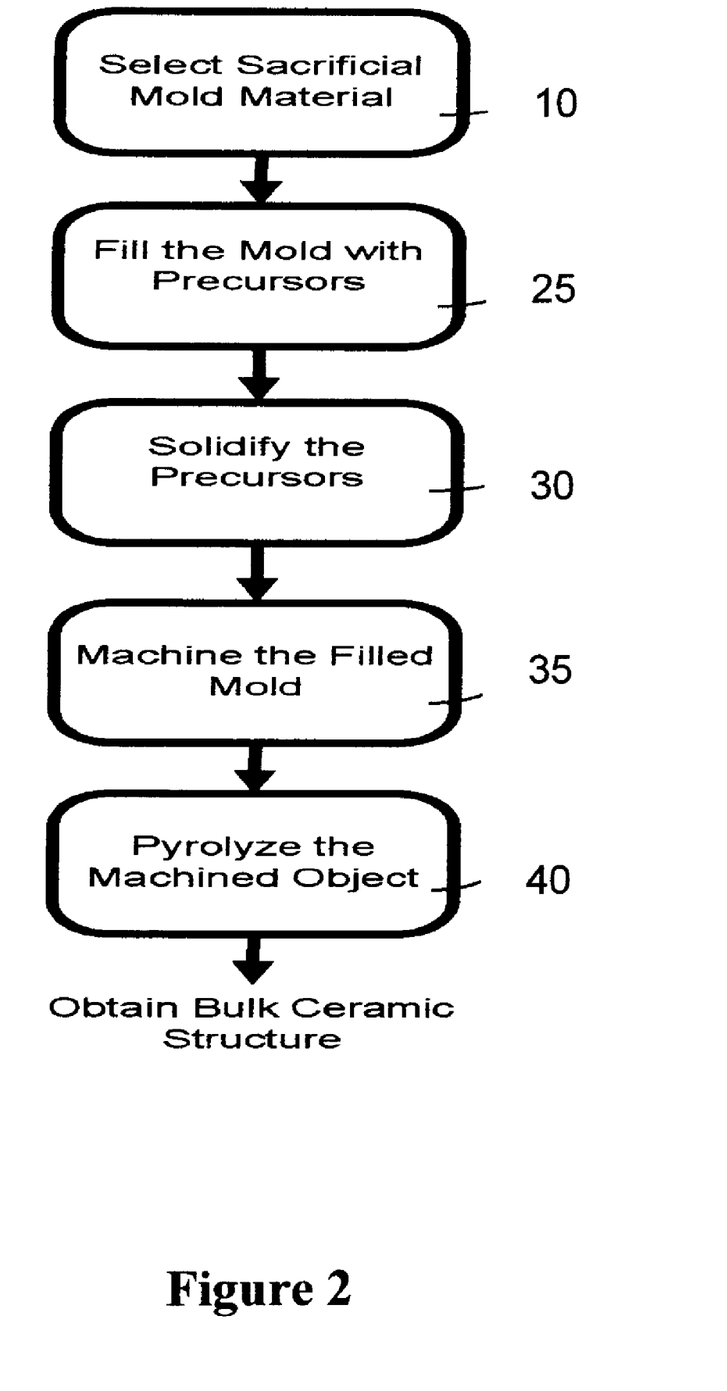
FIG. 2 is a schematic representation of the method of the present invention for synthesizing bulk ceramics in a technique using sacrificial molds.

FIG. 2 shows that the first method or process step for the present invention is selecting a sacrificial mold with an open-cell pore network 10, such as the porous network of a polymeric sponge. Next, the sacrificial mold is filled with or saturated with a polymeric precursor, such as, polysilazane 25. The polymeric precursor is solidified or cured to produce a ceramic green body 30. The ceramic green body is machined into desired shapes and dimensions to form a green compact structure 35 that subsequently undergoes pyrolysis in an oxygen-free atmosphere at temperatures of approximately 1000° C., or at higher temperatures for higher strength 40 to form the dense crack-free, bulk ceramic structure suitable for use in high temperature, high pressure conditions often reserved for use of metals or metallic components.

The novelty of the process includes, but is not limited to, the use of an open cell material with cell sizes of less than approximately 1 mm to approximately 3 mm that provides the structural shape of the ceramic green body that is allowed to solidify. The solid green body can be machined into desired shapes and dimensions before the final pyrolysis into a bulk ceramic structure. During pyrolysis, the sacrificial mold forms gas release paths, to release the large amount of gases generated and also thermally decomposes the sacrificial mold, leaving a tough, durable, bulk ceramic structure which can be machined and further shaped to provide a polymer derived ceramic structure of desired porosity, resistance, strength, toughness, and purity.

The function and decomposition of the open cell material is the reason for designating the material a "sacrificial mold." The open cell material can be a polymer foam, polymer sponge, fiber mesh, cotton ball, cotton candy or any material with removable interconnected structures with open pores and the removal or decomposition process may be by any known process, including but not limited to thermal methods, radioactive treatments, washing and the like.

Figure 3A:
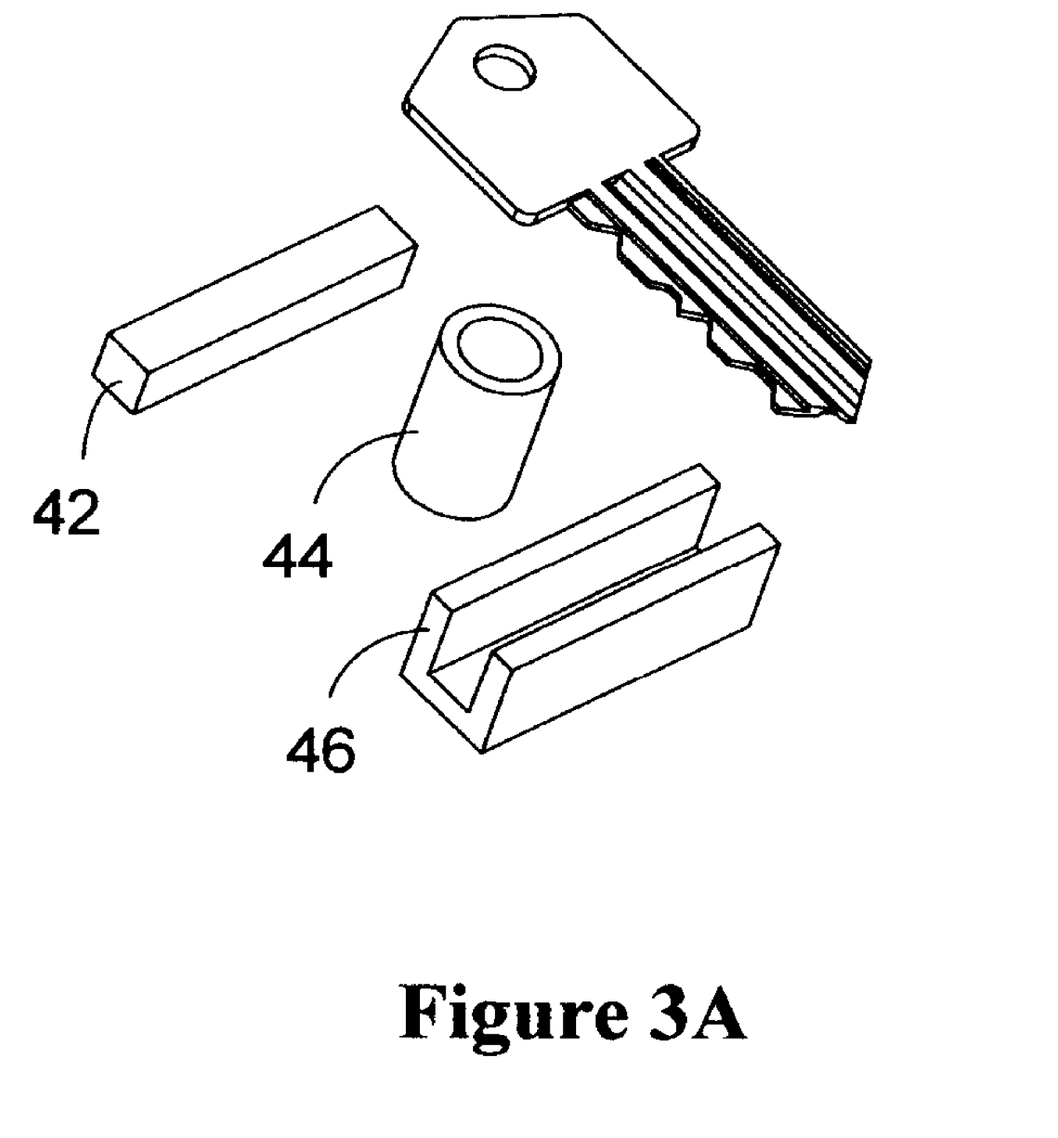
FIG. 3A is a drawing of a top view of a dense silicon-based ceramic structure of the present invention.
Figure 3B:
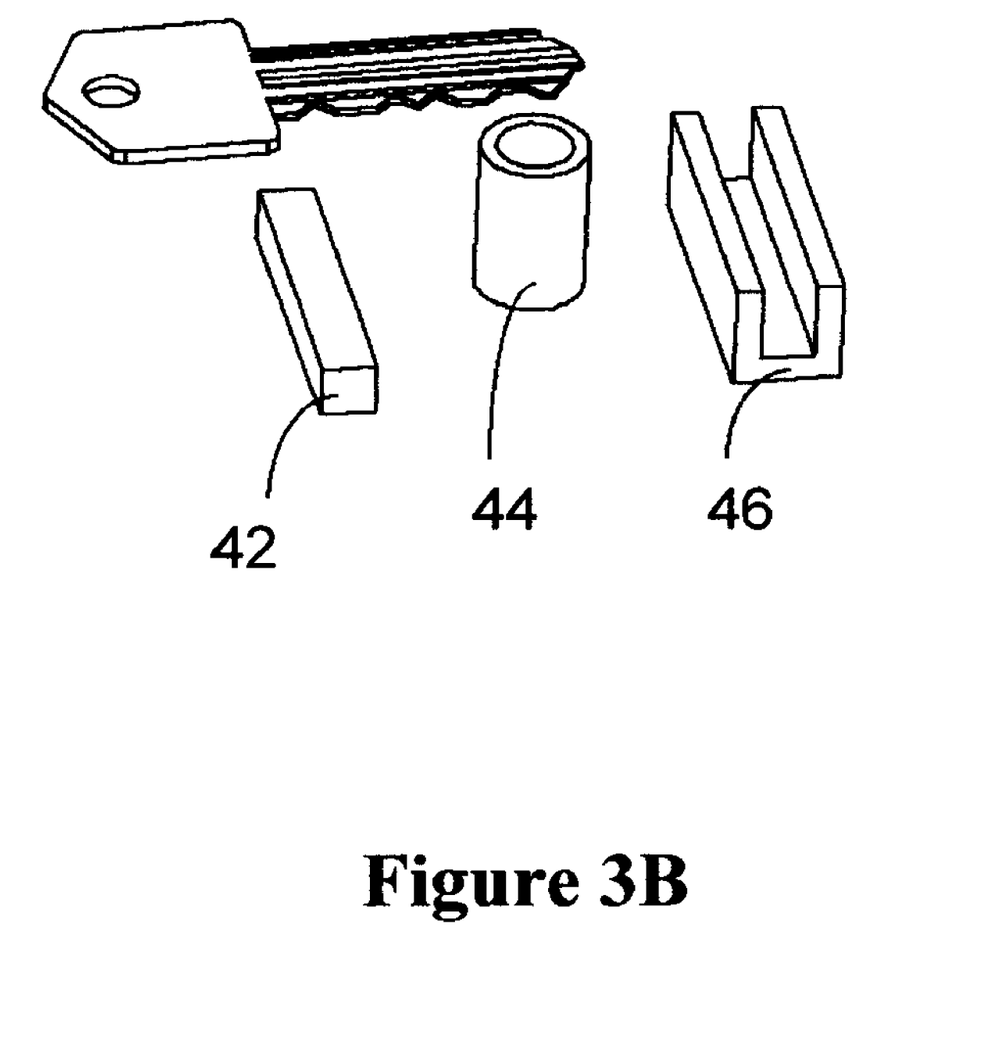
FIG. 3B is a drawing of a side view of a dense silicon-based ceramic structure of the present invention.

FIGS. 3A and 3B are drawings of different views of machined objects shaped from the dense silicon-based ceramics of the present invention. FIG. 3A is a top view and FIG. 3B is a side view, showing dense, crack-free structures, including a bar 42, a tubular piece 44 and a rectangular shaped piece 46 with upward extending sides.

For purposes of illustrating the present invention, but not as a limitation, a general description of the synthesis process includes selecting an open cell polymer sponge with cell sizes of less than 1-3 millimeters (mm), such as a polyurethane sponge, which is commercially available and widely used in packaging. The selected open-cell material will preferably have a decomposition temperature lower than or not significantly higher than that of the ceramic precursor. In the example wherein the open cell material is a polymer sponge, the sponge is cut into a desired shape, and then it is infiltrated with a ceramic precursor, such as polysilazane. The entire piece is cured to produce a green body. Curing can be thermal curing, photo-curing or radioactive curing.

After curing, the green body can be machined using suitable machining tools. After machining, the ceramic green body is subjected to pyrolysis in a furnace at approximately 1000° C. under an oxygen-free atmosphere. The end-product is a bulk ceramic structure of high density with inter-connected fine pores. The strength of the structure is pore size dependent and can be controlled by choosing different polymer sponges. These highly dense samples coming from polysilazane are suitable for many applications, such as, ceramic substrates, ceramic crucibles, and the like.

An open cell material serves as the sacrificial mold for the polymer derived ceramics of the present invention. Open cell materials suitable for the process of the present invention can have a decomposition temperature that overlaps that of the ceramic precursor wherein steps must be taken to lower the decomposition or degradation temperature. If a polymer sponge is used as the open cell material, it is often easier to lower the degradation temperature of a certain polymer than to increase it, so selecting a polymer sponge with a decomposition temperature lower or not significantly higher than that of the ceramic precursor is preferred. There are also other ways of removing the polymer sponge, such as washing or using radioactive treatments instead of thermal decomposition. Any means known to those skilled in the art for removing the open cell polymer sponge is contemplated by the present invention.

The ceramic precursor of the present invention is purely liquid, or a solid precursor dissolved in a solvent or a liquid based slurry which is suspended, dispersed and cured in an open cell polymer sponge which is further processed into a final ceramic part. The liquid ceramic precursor is much easier to work with in the forming of a green body, unlike the ceramic powders used in the prior art, which are inconvenient to work with in making various shapes.

Ceramic precursors that are suitable for the present invention, include, but are not limited to, polysilazane, polysilane, polysiloxane, polymethylcarbosilane, and the like. It also could be a liquid slurry consisting of metal or ceramic particles suspended in a liquid ceramic precursor, for example, Hf or Zr metal particles suspended in polycarbosilane to make HfC or ZrC containing ceramics.

EXAMPLE 1

Synthesis of Dense Silicon-based Ceramics with Sacrificial Mold

A piece of chosen polymer sponge is cut into a shape. Then it was infiltrated with a liquid ceramic precursor, polysilazane. The polysilazane precursor is pre-added with 1 wt % polymerization initiators, for example, dicumyl peroxide. After infiltration, the whole piece is put in an oven under nitrogen atmosphere at 150° C. for 2 hrs to finish the curing process. The cured piece is then machined into desired shape by lathe. The pyrolysis is done in a tube furnace under ultra-high purity nitrogen at 1000° C. for 4 hrs.

The process described above produces dense crack-free bulk ceramics from the thermal decomposition of polymeric precursors using an open-cell material as a sacrificial mold that forms gas release paths, to release the large amount of gases generated during pyrolysis of the precursors. A ceramic green body is produced after the first heating or curing process which is tough, dense, crack-free and machinable. Thus, ceramic products and complex shaped components can be machined for medium and high temperature applications in fields including, but not limited to air and spacecraft structures, energy, environmental, transportation, and communication technologies.

The advantages of the invention are an easy synthesis process with low temperature/pressure processing for preparation of polymer derived ceramics without additives, fillers and powders. The final ceramic structures possess unique properties such as high purity, greatly increased structural integrity, high machinability for industrial applications requiring ceramic substrates and complex shaped structures.

Commercial uses of the present invention are extensive, including, but not limited to, new heretofore impossible 'solid' geometries, bulk ceramic parts, ceramic crucibles, a replacement material in some applications involving glass, silicon carbides, silicon nitrides, hafnium carbide and the like.

While the invention has been described, disclosed, illustrated and shown in various terms of certain embodiments or modifications which it has presumed in practice, the scope of the invention is not intended to be, nor should it be deemed to be, limited thereby and such other modifications or embodiments as may be suggested by the teachings herein are particularly reserved especially as they fall within the breadth and scope of the claims here appended.

We claim:

1. A method for synthesizing a dense, crack-free bulk ceramic structure to replace metal or metallic structures consisting of the steps of:
    selecting an open cell material with an open cell size in a range between 1 mm and approximately 3 mm in diameter to function as a sacrificial mold;
    cutting the open cell material into a desired shape;
    selecting a liquid polymeric ceramic precursor from the group consisting of polysilazane, polysilane, polysiloxane and polymethylcarbosilane;
    adding approximately 1 weight % polymerization initiator to the liquid polymeric ceramic precursor to form mixture (I);
    saturating the open cell material with the mixture (I) of polymerization initiator and liquid polymeric ceramic precursor selected from at least one of polysilazane, polysilane, polysiloxane and polymethylcarbosilane;
    curing the open cell material saturated with the ceramic precursor and polymerization iniator in an oven under nitrogen atmosphere at 150° C. to form a dense, solid, body of material that can be converted into a ceramic by pyrolysis and is referred to as a ceramic green body;
    shaping the solid ceramic green body into a bulk structure with at least one of a lathe and a laser; and
    pyrolizing the shaped green body, in an oxygen-free atmosphere at a temperature lower than the thermal decomposition temperature of the ceramic precursor, for a period of time to leave a channel network that allows the gaseous products from the pyrolysis of the ceramic precursor to escape without building up pressure which would cause cracks, thereby thermally decomposing the sacrificial mold, and forming a dense, crack-free bulk ceramic structure wherein the density of the final ceramic product is between approximately 91% to approximately 98% of theoretical maximum density thereby providing a dense, crack-free ceramic structure suitable for use in temperature and pressure conditions reserved for use of metal or metallic components.

2. The method of claim 1, wherein the ceramic precursor is at least one of a liquid ceramic precursor and a liquid ceramic precursor based slurry wherein the liquid ceramic precursor based slurry is selected from the group consisting of metal particles suspended in a liquid ceramic precursor and ceramic particles suspended in a liquid ceramic precursor.

3. The method of claim 2, wherein the liquid ceramic precursor based slurry consists of metal particles selected from the group consisting of hafnium (Hf) and zirconium (Zr) suspended in a liquid ceramic precursor.

4. The method of claim 1 wherein the open cell material has a decomposition temperature in a range from a temperature that is lower than the starting decomposition temperature of the ceramic green body and a temperature that is slightly higher than the starting decomposition temperature of the ceramic green body.

5. The method of claim 4 wherein the open-cell material is selected from at least one of a polymeric foam, a polymeric sponge, a glass fiber mesh, a metal fiber mesh, a cotton ball, a cotton candy, a spun fabric, and a woven fabric.

6. The method of claim 5, wherein the open-cell material is a polymeric foam.

7. The method of claim 6, wherein the polymeric foam is open-cell polyurethane with cell size between 1 mm to approximately 3 mm.

8. The method of claim 4, wherein the open-cell material functions as a sacrificial mold and decomposes during the pyrolysis of the cured ceramic green body.

9. The method of claim 4, wherein the open-cell material functions as a sacrificial mold and is removed by a process selected from at least one of washing, radioactive treatment and thermal decomposition before the pyrolysis of the cured ceramic green body.

10. The method of claim 4, wherein the open-cell material functions as a sacrificial mold and is removed by a process selected from at least one of washing, radioactive treatment and thermal decomposition during the pyrolysis of the cured ceramic green body.

11. The method of claim 1, wherein the heating of a shaped green body in an oxygen-free atmosphere, wherein the oxygen-free atmosphere is at least one of argon and ammonia and at a temperature range between approximately 800° C. and approximately 1600° C.

12. A method for synthesizing a dense, crack-free bulk ceramic structure consisting of the steps of:
    selecting an open cell material with an open cell size in a range between 1 mm and approximately 3 mm in diameter to function as a sacrificial mold;
    cutting the open cell material into a desired shape;
    selecting a liquid polymeric ceramic precursor based slurry containing at least one of metal particles and ceramic particles suspended in the liquid ceramic precursor selected from the group consisting of polysilazane, polysilane, polysiloxane and polymethylcarbosilane and mixtures thereof;
    adding approximately 1 weight % polymerization initiator to the liquid polymeric ceramic precursor based slurry to form mixture (II);
    saturating the open cell material with the mixture (II) of polymerization initiator and liquid polymeric ceramic precursor based slurry containing at least one of metal particles and ceramic particles suspended in the liquid ceramic precursor;
    curing the open cell material saturated with the ceramic precursor slurry containing metal particles and polymerization iniator to form a dense, solid, body of material that can be converted into a ceramic by pyrolysis and is referred to as a ceramic green body;

shaping the solid ceramic green body into a bulk structure with a laser; and pyrolizing the shaped green body, in an oxygen-free atmosphere at a temperature lower than the thermal decomposition temperature of the ceramic precursor, for a period of time to leave a channel network that allows the gaseous products from the pyrolysis of the ceramic precursor to escape without building up pressure which would cause cracks, thereby thermally decomposing the sacrificial mold, and forming a dense, crack-free bulk ceramic structure wherein the density of the final ceramic product is between approximately 91% to approximately 98% of theoretical maximum density, thereby providing a dense, crack-free ceramic structure suitable for use in temperature and pressure conditions reserved for use of metal or metallic components.

13. The method of claim 12 wherein the open-cell material is selected from at least one of a polymeric foam, a polymeric sponge, a glass fiber mesh, a metal fiber mesh, a cotton ball, a cotton candy, a spun fabric, and a woven fabric.

14. The method of claim 13, wherein the open-cell material is a polymeric foam with a cell size in a range from 1 mm to approximately 3 mm in diameter.

15. The method of claim 14, wherein the open-cell material functions as a sacrificial mold and decomposes during the pyrolysis of the cured ceramic green body in an oxygen-free atmosphere and at a temperature range between approximately 800° C. and approximately 1600° C.

16. The method of claim 15, wherein the oxygen-free atmosphere is at least one of argon and ammonia.

* * * * *